(12) United States Patent
Caso et al.

(10) Patent No.: US 8,296,338 B2
(45) Date of Patent: Oct. 23, 2012

(54) METHOD FOR A CLOUD-BASED META-FILE SYSTEM TO VIRTUALLY UNIFY REMOTE AND LOCAL FILES ACROSS A RANGE OF DEVICES' LOCAL FILE SYSTEMS

(75) Inventors: Erik Caso, Santa Monica, CA (US); Michael Abraham, Boulder, CO (US)

(73) Assignee: Entangled Media Corp., Huntingdon Beach, CA (US)

( * ) Notice: Subject to any disclaimer, the term of this patent is extended or adjusted under 35 U.S.C. 154(b) by 226 days.

(21) Appl. No.: 12/774,231

(22) Filed: May 5, 2010

(65) Prior Publication Data
US 2010/0287219 A1  Nov. 11, 2010

Related U.S. Application Data

(60) Provisional application No. 61/175,489, filed on May 5, 2009.

(51) Int. Cl.
*G06F 12/00* (2006.01)
*G06F 17/30* (2006.01)
(52) U.S. Cl. .................................. 707/827; 717/168
(58) Field of Classification Search .............. 707/827
See application file for complete search history.

(56) References Cited

U.S. PATENT DOCUMENTS

| | | | |
|---|---|---|---|
| 6,381,019 B1 | 4/2002 | Maris | 356/432 |
| 6,499,054 B1 | 12/2002 | Hesselink et al. | 709/204 |
| 6,512,586 B2 | 1/2003 | Maris | 356/432 |
| 6,732,158 B1 | 5/2004 | Hesselink et al. | 709/208 |
| 6,938,042 B2 | 8/2005 | Aboulhosn et al. | 1/1 |
| 7,120,692 B2 | 10/2006 | Hesselink et al. | 709/225 |
| 7,337,171 B2 | 2/2008 | Gimpl et al. | 1/1 |
| 7,467,187 B2 | 12/2008 | Hesselink et al. | 709/205 |
| 7,499,905 B2 | 3/2009 | Jaschek et al. | 1/1 |
| 7,546,353 B2 | 6/2009 | Hesselink et al. | 709/216 |
| 7,587,467 B2 | 9/2009 | Hesselink et al. | 709/214 |
| 7,587,471 B2 | 9/2009 | Yasuda et al. | 709/220 |
| 7,600,036 B2 | 10/2009 | Hesselink et al. | 709/234 |
| 7,805,565 B1* | 9/2010 | Milligan et al. | 711/114 |
| 2004/0172449 A1 | 9/2004 | Hesselink et al. | 709/204 |
| 2005/0114711 A1 | 5/2005 | Hesselink et al. | 726/4 |
| 2005/0138186 A1 | 6/2005 | Hesselink et al. | 709/229 |
| 2005/0144195 A1 | 6/2005 | Hesselink et al. | 1/1 |
| 2005/0144200 A1 | 6/2005 | Hesselink et al. | 1/1 |

(Continued)

FOREIGN PATENT DOCUMENTS

JP  2004-046661  2/2004

(Continued)

*Primary Examiner* — Binh V. Ho
(74) *Attorney, Agent, or Firm* — Schwegman Lundberg & Woessner, P.A.

(57) ABSTRACT

A system and process that establish a singular shared file system among devices in order to create a virtual representation of data on all of the devices via metadata indexing. This virtual representation of data means that the files are not actually stored on all devices and thus, with the exception of a single physical location, they do not need to take up any space (i.e. storage) on any additional device's hard drive. This allows for significant amounts of data to be virtually stored on each device, even if there is no physical storage room available for the data on each device. The system and process do not require data to be stored on a provider server, but instead stores only lightweight metadata, i.e., a small fraction of information about the files, online.

14 Claims, 6 Drawing Sheets

U.S. PATENT DOCUMENTS

| | | | |
|---|---|---|---|
| 2005/0149481 A1 | 7/2005 | Hesselink et al. | 1/1 |
| 2005/0256909 A1 | 11/2005 | Aboulhosn et al. | 1/1 |
| 2006/0206533 A1 | 9/2006 | MacLaurin et al. | 707/200 |
| 2006/0277314 A1 | 12/2006 | Hesselink et al. | 709/229 |
| 2007/0162510 A1 | 7/2007 | Lenzmeier et al. | 707/200 |
| 2008/0082490 A1* | 4/2008 | MacLaurin et al. | 707/3 |
| 2008/0104077 A1 | 5/2008 | Gimpl et al. | 1/1 |
| 2008/0189390 A1* | 8/2008 | Heller et al. | 709/218 |
| 2009/0062944 A1* | 3/2009 | Wood et al. | 700/94 |
| 2009/0254592 A1 | 10/2009 | Marinov et al. | 1/1 |
| 2010/0205152 A1* | 8/2010 | Ansari et al. | 707/654 |
| 2010/0274982 A1* | 10/2010 | Mehr et al. | 711/162 |
| 2011/0093471 A1* | 4/2011 | Brockway et al. | 707/747 |
| 2011/0110568 A1* | 5/2011 | Vesper et al. | 382/128 |
| 2011/0231844 A1* | 9/2011 | Ben-Shaul et al. | 718/1 |
| 2012/0079117 A1* | 3/2012 | Wills et al. | 709/226 |

FOREIGN PATENT DOCUMENTS

| | | |
|---|---|---|
| WO | WO 01/14634 | 3/2001 |
| WO | WO 01/40887 | 6/2001 |
| WO | WO 02/03046 | 1/2002 |
| WO | WO 03/085559 | 10/2003 |
| WO | WO 2004/046852 | 6/2004 |

* cited by examiner

US 8,296,338 B2

METHOD FOR A CLOUD-BASED META-FILE SYSTEM TO VIRTUALLY UNIFY REMOTE AND LOCAL FILES ACROSS A RANGE OF DEVICES' LOCAL FILE SYSTEMS

CROSS-REFERENCE TO RELATED APPLICATIONS

The present application claims the benefit of and incorporate by reference herein in its entirety U.S. provisional patent application Ser. No. 61/175,489, filed May 5, 2009 entitled Method For Virtual Synchronization Of Data Across Heterogeneous Devices And Performing On-Demand Transfer Of Remote Data Between Devices.

BACKGROUND OF THE INVENTION

1. Field of the Invention

The present invention relates generally to the field of data virtualization and more specifically to a system and method for using data virtualization coupled with a cloud-based file system that is shared among devices and integrated into the device operating system so as to unify the representation of files across devices for availability of and access to data across multiple devices a user might own.

2. Description of the Related Art

Competitive data synchronization products generally fall into one of two types: locally installed software for file replication across devices and online backup/storage based file replication across devices. The local install file replication software is installed on computers and makes sure that all devices with the same software have the same data physically replicated on each device. Once configured by the user, it is able to identify updates to files on one device and update the corresponding files on other devices. These products or services essentially duplicate all designated data between the devices being synchronized. Each file stored on N devices results in N duplicates of the same file. The online backup/storage based file replication software is a blend of software that installed on local devices along with online storage. The process requires that ALL designated data is stored online and is then in turn replicated across all devices that are connected to the online storage server. These services duplicate all designated data between devices being synchronized, AND store an additional copy on their servers. Each file stored on N devices results in N+1 duplicates of the same file.

SUMMARY OF THE INVENTION

The most obvious shortcoming of the data synchronization implementations described above is the amount of storage space that is required. For individual users with multiple devices, each with varying storage capacity, synchronization across all devices for all content on all devices is limited or even prohibited by space restrictions. Additionally, present solutions to the storage problem can be expensive, requiring payment for third party on-line storage or device storage upgrades. It is also important to note that with other solutions the data on separate devices is kept separated when synchronized-local data is stored in a set of locations within the operating system's native file system (e.g. "My Documents", "My Pictures", etc.), while remote data on other devices or other online services is kept in a new location such as a new directory/folder or secondary location (e.g., removable hard drive) mounted on the device. Finally, present solutions generally require a high-degree of user involvement for their operation—users must designate certain files and/or directories for synchronization or backup, and must consciously store content to be synced or backed-up in those locations. Accordingly, there is a need in the art for a system and process that facilitates access to content that physically resides on any one of multiple user devices, e.g., laptop, desktop, personal digital assistant (PDA), cell phone or the like, from any one of the multiple user devices without the need to physically store all content on every device, and without complex configuration or continual interaction from the user and without the data from multiple devices being treated as separate and, thus, segregated within the file system as such.

As described in detail herein, the present solution creates a unified representation of all data on all registered devices—it ensures that all a user's devices appear to share one single native file system containing all the user's files across all devices, and that this file system is that of the device operating system, instead of any third party solution or secondary representation. Unlike the existing solutions, the implementations described herein do not require physical data replication across multiple devices. Instead, the present solution creates a virtual representation of data on all of the devices using metadata indexing. This virtual representation of data means that the files are not actually stored on all devices and thus, with the exception of a single physical location, they take up limited space (i.e. storage) on any additional device's hard drive. This allows for otherwise impossible amounts of data to be virtually stored on each device, even if there is no physical storage room available for the data on each device. Furthermore, the present solution does not require data to be stored on a provider server, but instead stores only lightweight metadata (small fraction of information about the files) online. The solution establishes the ability for user devices to be aware of one another and communicate directly when data is requested. In addition to user devices, the solution described herein can also incorporate files stored in an online service account, such as a photo account or video account (exemplary—YouTube.com or Picasa.com). Finally, beyond initial installation, the present solution requires no configuration or interaction with the user to virtualize any and all data across all devices. Rather than act as software that is interacted with by the user, the present solution is designed to integrate with the operating system on a device and thus modify said operating system to not only account for files that are stored locally on the device (e.g. on the hard drive), but also account files on all other devices the user may own. This is done without adding additional storage locations, such as a networked storage location or a sync folder; it is done without the user having to continually designate files for inclusion or exclusion. Moreover, it does not present the user with a new or additional user interface, but rather relies entirely on the device operating system for such user interaction.

The solution described herein unifies the representation of and access to files and data across all of a user's devices, as well as online service accounts.

In a first exemplary embodiment of the present invention a process for establishing a singular file system across multiple devices is described. The process includes: receiving user information to open an account for establishing a singular file system across multiple devices via a web-based system that includes at least one server; installing an individual software client on each of the multiple devices via the web-based system; accepting registration of multiple devices via the web-based system; scanning each of the multiple devices by each of the individual software clients to inventory data on each of the multiple devices and create a meta-index of the files for the inventoried data; providing by the individual software clients via the multiple devices individual meta-indices of the inventoried data for each of the multiple devices to the at least one server; integrating by the at least one server the individual meta-indices to create a single master meta-index; providing by the at least one server the single master meta-index to each of the multiple devices via the individual software clients; and continually updating the single master meta-index on the at least one server and each of the multiple devices in response to changes to the data indexed thereon.

In a second exemplary embodiment of the present invention a process for operating on files located on multiple devices using a singular file system is described. The process includes: accepting a request to operate on a file at a first device, wherein the file is selected from the singular file system on the first device; intercepting the request by a software client on the first device; determining by the software client if the file is physically located on the first device or a second device, wherein a visual representation of the singular file system on the first device is identical to a visual representation of the singular file system on the second device; if the file is physically located on a second device, requesting by the software client on the first device that a peer-to-peer connection be brokered by a server-based web service between the first device and the second device; if the peer-to-peer connection is brokered, transferring the physical file from the second device to the first device; and performing the operation on the file at the first device.

In a third exemplary embodiment, a system for establishing a singular file system across multiple devices is described. The system includes: a web-accessible server; at least one software client plug-in; multiple devices for storing and operating on files; wherein the web-accessible server receives user information to open an account for establishing a singular file system across multiple devices, installs the at least one software plug-in on each of the multiple devices, accepts registration of the multiple devices, wherein the at least one software plug-in varies in accordance with an operating system of each of the multiple devices; further wherein the at least one software client plug-in scans its respective one of the multiple devices to inventory files thereon, creates a meta-index to files for the inventoried data, provides the meta-index of the inventoried data for its respective one of the multiple devices to the web-accessible server; further wherein the web-accessible server receives meta-indices from each of the multiple devices and integrates by the meta-indices to create a single master meta-index, provides the single master meta-index to each of the multiple devices via the individual software clients, and continually updates the single master meta-index on each of the multiple devices in response to operations on the files indexed thereon.

BRIEF DESCRIPTION OF THE FIGURES

The following Figures are intended to be considered in conjunction with the descriptions provided herein and represent exemplary systems and processes of the present invention.

DETAILED DESCRIPTION OF THE INVENTION

The following words and phrases are used throughout this document and are attributed the definitions provided below for the purposes of describing the invention. One skilled in the art recognizes that there are obvious extensions to certain of these definitions and these are intended to fall within the scope of the listed definition, even if not explicitly reference therein.

Devices—Internet-enabled devices that may be used for a variety of communications and data purposes, including document creation, media players, Internet browsing, etc. These devices include desktop computers, laptop computers, netbooks, mobile Internet Devices (MIDs), smartphone mobile handsets, "nettop" computers, gaming consoles, cable set-top boxes, televisions and other computing devices and telecommunications devices that are able to communicate using any form of data communications protocols such as TCP/IP, 30, CDMA, GSM, OSM, WiFi, WiMax, etc.

File System—is the component within an operating system responsible for managing all manner of files, as well as presenting them within a graphical user interface. The native file system of any given operating system has a set of standard file storage options, such as "My Documents" for documents, "My Music" for music, "My Pictures" for pictures, and so on. Local file systems allow for secondary file systems to be "mounted" and even accommodate the tracking of such file, but in all cases are managed separately. An example of this would be a USB thumb drive, which, when plugged into a computer, is mounted as a secondary storage location.

Local Device—is a device that a user (person) is currently using (i.e. they are in front of the device and actively using it).

Remote Device—is a device that the user (person) is not using; this device is in another location and is only accessible via an Internet connection.

Software Client (or the Client)—is a piece of software that is installed and runs continuously on the device.

Web Service—is a part of the system that operates on the Internet and is made up of several types of web technologies including web servers, databases, peer-to-peer services (e.g., jingle, BitTorrent, Skype, JXTA), an HTTP Relay and other systems that interact with the clients. The web service acts as an information manager that coordinates information, communication and activities with the clients. It also coordinates the transfer of files between devices by establishing a transfer protocol, such as peer-to-peer or HTTP relay, or other such method, depending on the type of connection that is available for a given network or Internet connection.

Figure 1:
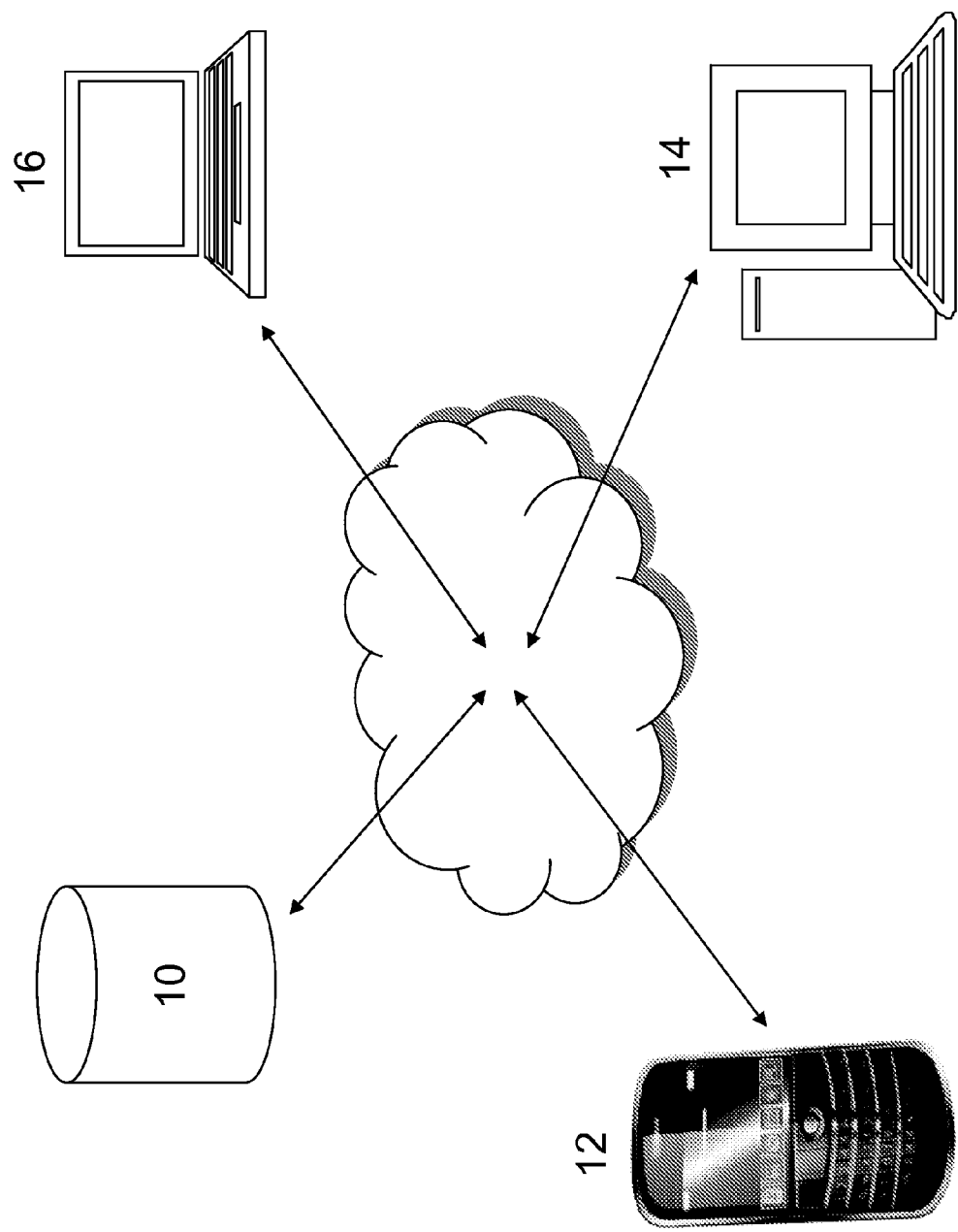
FIG. 1 is a schematic showing an exemplary configuration of the components of the invention.

Referring to FIG. 1 an exemplary system includes of a server 10 which hosts a web service and various user devices such as PDA 12, laptop computer 14 and desktop computer 16 with a particular software client installed thereon, to facilitate the virtual unification of data, including documents and media files, across all devices 12, 14 and 16. The system facilitates transfer of data (e.g. files) on-demand between devices when requested. The devices 12, 14 and 16 are merely exemplary and can vary in their number, type, use and operating system/platform, ranging from mobile phones to desktop computers to gaming consoles or cable set-top boxes, each running a different operating system that uses a proprietary and different file system. In addition to user devices, the solution described herein can also incorporate files stored in an online service account, such as a photo account or video account (exemplary—YouTube.com or Picasa.com). Additionally, though a single server is shown for illustration purposes, multiple servers, databases, processors may be used to implement the invention.

The system's method of data unification does not rely on file replication or cloning, but instead creates "virtual" file unification using a proprietary technique of differentiating local, physically stored data files versus remote data files and creating a unified, virtual representation of remote data on a local device. The system uses an operating-system extension, in conjunction with an intelligent web service, to determine the varying types of data that exist on each device that is a part of the system. The system will differentiate data on a Local Device from data on a Remote Device. The system then communicates to each client what data is remote so that each client can create the virtual representation of the remote data within its local device file system. The client creates the virtual representation of all remote files using the same "path" or storage location on the remote device, resulting in a common, single view of all data across all devices that is consistent with the formatting and structure of the local file system.

Critical to the unique nature of this system is that it is totally transparent, not requiring the user to interact with software, nor distinguish files in local vs. remote locations. All file metadata is integrated into the local device so that the view of data is common across all devices as if the files were actually stored locally across all devices, even though they are not. In essence, each device file system then acts as if it is a shared file system; enabling the local operating system to manage remote and local file as if they are all stored in the same location. For example, moving a file on one device results in the file moving on all other devices, even if it was moved on a device where that file is virtual.

Figure 2:
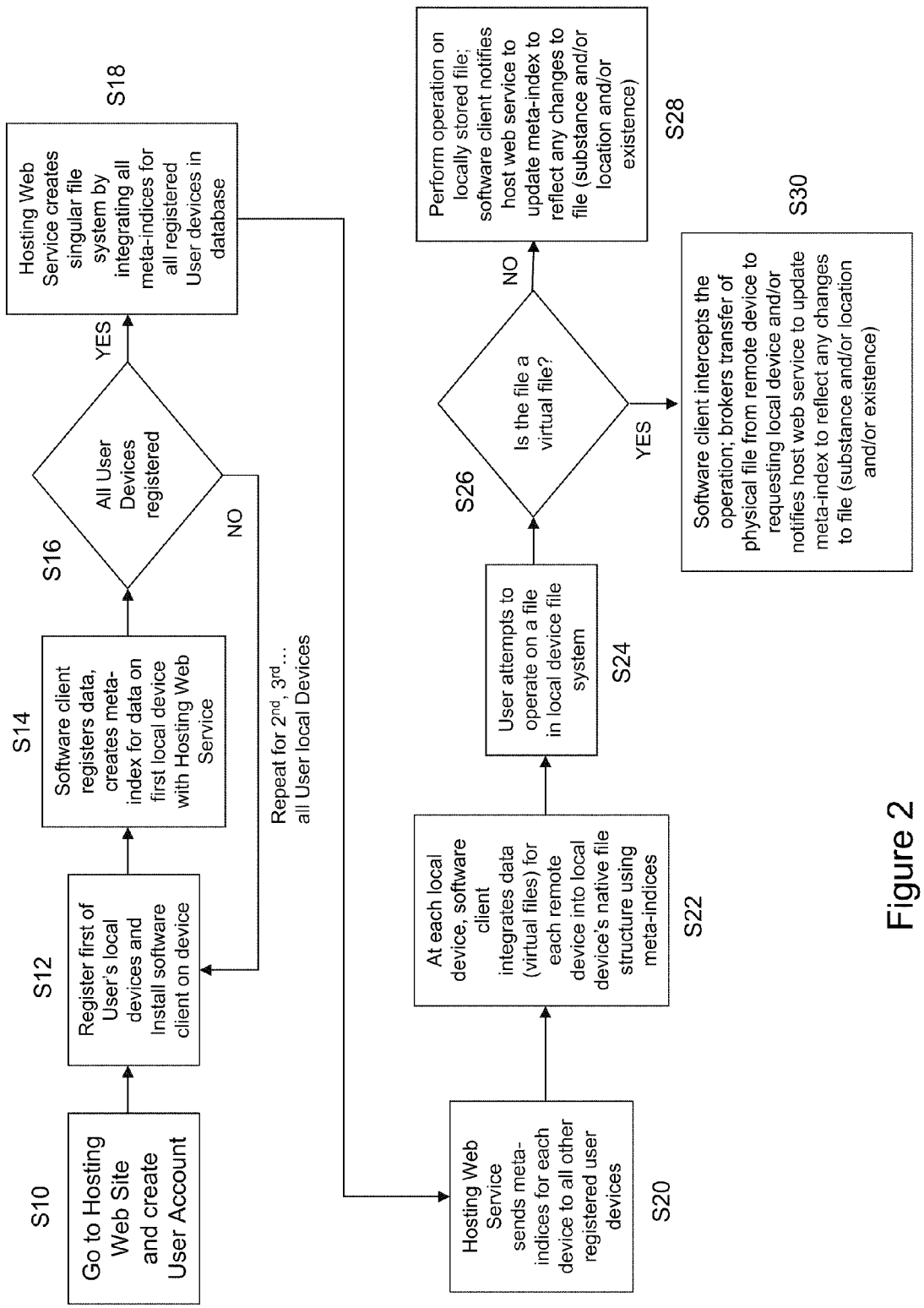
FIG. 2 is a device registration and data virtualization process flow in accordance with an exemplary embodiment of the present invention.

Referring to FIG. 2, a detailed overview of a first exemplary process from user sign-up to virtual file access across devices is shown. In S10, access to the system is accomplished via creation of a user account with the provider of the service. Registration information includes user name, e-mail address and other required personal information as well as creation of user name and password to facilitate establishing and securing a user account. Once an account has been created, the user can install the required software client on each of their individual devices and initiate the process of registering each device with the service provider S12. As part of the registration process, for each individual user device, the user names the device, e.g., laptop, desktop, smartphone (e.g., Blackberry, Droid), and selects the type or category of data, e.g., documents (exemplary: text), pictures (exemplary: .jpg, .img), audio (exemplary: MP3), video (exemplary: .dvi, files .mov files) available on the device that the user wishes to virtually unify across multiple devices. In a preferred embodiment, all categories are automatically selected. Alternatively, this selection may be accomplished by a drop down menu listing file types, categories, extensions, etc. For online service accounts, the user registers these accounts and provides appropriate log-in information, e.g., username and password. As described below, once this selection is made, the installed software client then scans and inventories the selected data into a meta-index of the file system and reports back to the web service on that selected data S14 in order to create a singular file system based on said metadata that is shared among all devices in the user's account. Alternatively, once the software client is installed on the user device, it could automatically scan and inventory all the data available on the user device and report back to the service provider. The web service can then create a listing of the inventory and prompt the user to select which data the user wishes to virtually synchronize.

The software client provides user device data in the form of a meta-index. For each identified data file, the meta-index includes metadata such as file name, file type, file size, local path the file is stored in, date created, date modified, etc. Once all of the user's devices and on-line service accounts are registered and meta-indexed by the software client S16 (or the service provider in the case of the on-line service accounts by interacting through the respective application programming interfaces (APIs) of the on-line services to obtain data information), the web service integrates all of the individual meta-indices for all of the user's registered devices into a database S18. This master index of metadata thus becomes the singular file system that all devices use; integrated locally into a device's operating system via the software client. The web service then sends the meta-indices for each of the registered devices to each of the other individual registered user devices S20. At each registered local device, the software client integrates metadata from the remote device indices into the local device's file system S22. The metadata instructs the software client where to store the data files, ensuring that a common view and storage location is maintained across all devices. At this point, the local operating system's file system has been modified to include remote files in the same locations of the local device (such as the "My Documents" folder) as opposed to a separate and segregated location for such remote data (such as a synchronization folder or an additional hard drive "mounted" on the device.) Further, the software client facilitates the creation of a visual representation of the remote or virtual files on the local device, as if the files were indeed local, allowing the user to operate on them as if they were local to the device. The virtual files appear in essentially all ways the same as a local file, making them indistinguishable unless such a distinction is enabled as a separate option. Lastly, if a unique folder or directory exists on one device (e.g. within the My Documents folder) and has several files within it, that folder/directory is created on all other devices so that its files may be put within said folder/directory, ultimately representing the same path to all corresponding files.

Using their local device, the user attempts to operate on a file S24. If the file is a local file, physically located on the local device, the operation is performed on the local file and the software client notifies the web service to update the meta-index to reflect any changes to the attributes of the file, e.g., substantive, location or existence thereof S26, S28. If the user attempts an operation on a virtual file that is physically stored on a remote device, the software client intercepts the operation request and, if the file is to being opened or executed, the software client brokers a connection between the remote device containing the physical file and the local device requesting the file S30. The file is then transferred from the remote device to the local device and the operation is performed on the file at the local device. As in S28, details regarding the location, status, and existence of the file are provided to the web service by the local software client which allows all other devices being unified to be continuously made aware of the changes in the location or existence of the file S30. Once the file has been transferred from the remote device to the local device, it can be viewed, edited, or modified in any way by the user. Upon completion of any modification to the file, all changes are propagated back to the remote device and the local file is restored to its 'virtual' state. At this point the local device removes the aforementioned file from memory, so that it is stored only in the single location/device on which it was originally kept. Additionally, the aforementioned file's metadata is updated (such as "date last modified") and propagated to all other devices. The method of file transfer may vary, initially attempted via peer-to-peer methodology. Under certain circumstances, a peer-to-peer connection might be prohibited from occurring, at which point the web service will itself manage the connection (via HTTP Relay) between devices to ensure communication can always occur. Alternatively, for virtual files located with an on-line service provider, when the user attempts to operate thereon from a local device file system, a browser window is opened within the on-line service to facilitate operation.

Figure 3:
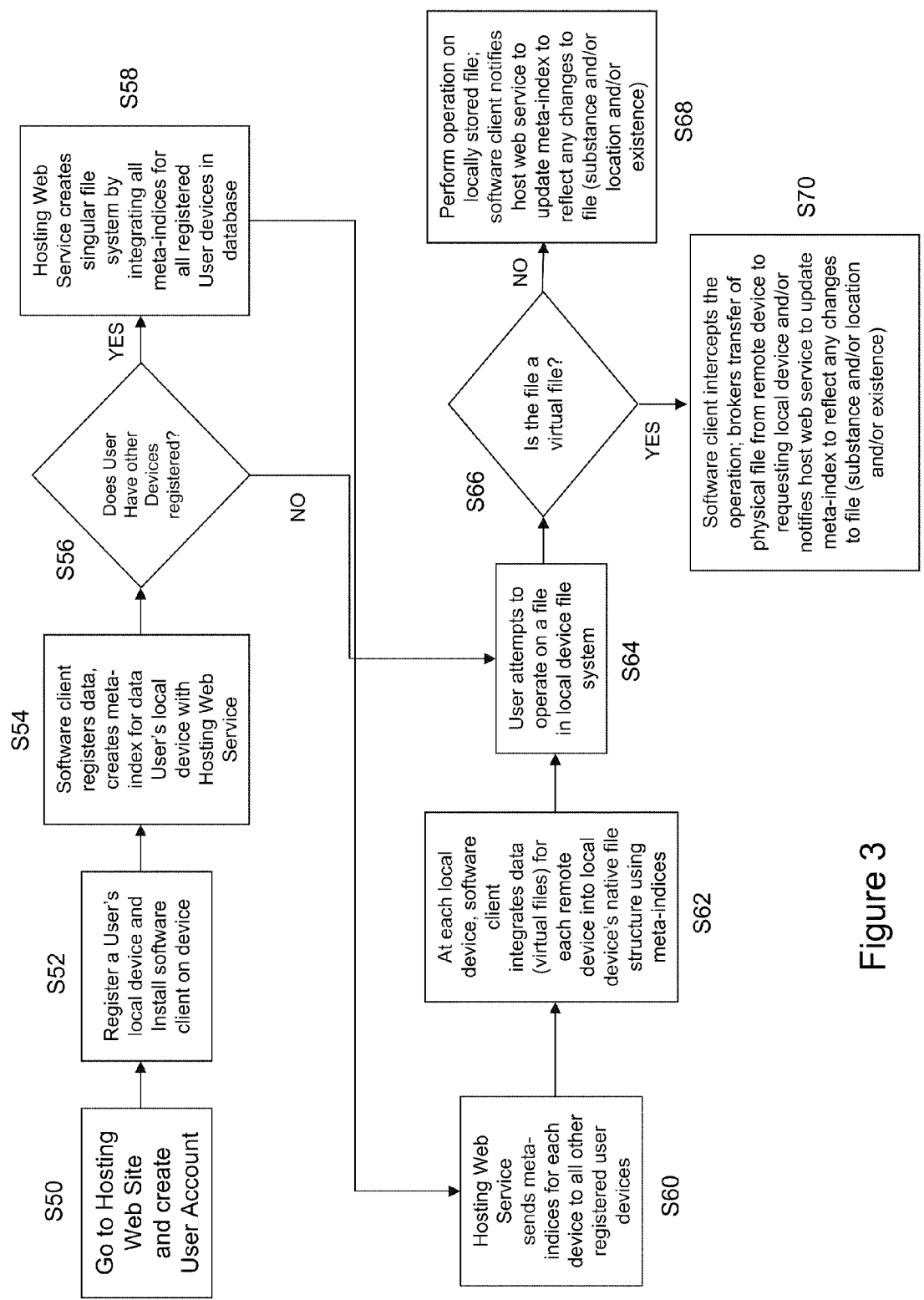
FIG. 3 is a device registration and data virtualization process flow in accordance with an exemplary embodiment of the present invention.

FIG. 3 illustrates an alternative exemplary process flow. In this flow, which is substantially similar to the process flow from FIG. 2, this flow illustrates the process flow wherein there is only a single registered user device and devices are added sequentially. After creating an account S50, the user registers a device S52 and the downloaded software client creates a meta-index for the device data and stores in the web service database S54. If the user has no other registered devices ("NO" to S56), when the user performs operations on device files S64, the answer to the question "Is the file a virtual file?" S66, will always be "NO" and the software client will report local file changes to the web service S68.

If the user does have other registered devices ("YES" to S56), the process S58-S70 follows the same flow as steps S20-S30 in FIG. 2.

Accordingly, if a user has a desktop computer and laptop computer and a smartphone, the processes described herein essentially unify the data across those devices once they are registered them with the web service. The user can add and remove devices associated with their customer account at their convenience. The data that is unified across the devices correlates specifically to what devices the user adds to their customer account.

The embodiments described herein create a single unified file system that is shared across multiple devices a user might own. The software client provided by the web service to facilitate this unification is downloaded to a user's individual devices as described above. The software client is provided in the form of an operating system extension, or 'plug-in' that is unique to the type of device/operating system which is established at the time of registration. The plug-in modifies the natural behavior of the operating systems of the individual registered devices in a way that, as it pertains to remote files, prevents the operating system from doing what it normally does. This is akin to rewriting the behavior of the operating system itself and how it treats files and, thus, runs in a mode that *is* the operating system. This is different from software that runs in a mode that is secondary to the operating system's operations. The software client is responsible for at least: indexing the device data in a meta-index in accordance with user selection of data types; providing the meta-index for its device to the web service; receiving meta-index information for all other registered devices on the user's account; creating virtual files in the file system of its device in the file system format of its device; updating the file system of its device to reflect changes to all virtual (remote) files in accordance with meta-index changes provided by the web service; informing the web service of changes to local files; facilitating communications between its device and other registered devices to retrieve remote files for operation on the local device.

The virtual files appear to the user exactly as local files. For example, each virtual file includes a thumb nail with an icon, it would have the file name, the file size, the file type, the date it was created, the date it was modified, all that the physical file has except that it doesn't take any space on the local device with the exception of the space required for meta-data storage (less than 1 kilobyte per file). The virtual files act as mock files and mock the properties of the physical file. By way of example, if the physical file of File.DOC$_{PHY}$ is located on the hard drive of Device A, a virtual file of File.DOC$_{VIR}$ will be located in the same corresponding file directory of the hard drive on registered Device B and Device C. When the user moves File.DOC$_{PHY}$ from its stored directory (e.g. . . . /My Documents/Proposals) on the hard drive of Device A to the desktop directory of Device A, this move will be indexed by the software client of Device A, provided to the web service, the user meta-index database at the web service will be updated to reflect the move, the software clients of Devices B and C will be notified of the move and the software clients of Devices B and C will updated Devices B and C, respectively, to show File.DOC$_{VIR}$ on the desktops (or equivalent locations) thereof. Conversely, if the same actions were performed on a virtual file, instead of the physical file, the same corresponding routines and results would occur, thus ensuring that regardless of a user interacting with the physical or virtual version of a file, they are treated as if they were the same.

Figure 4:
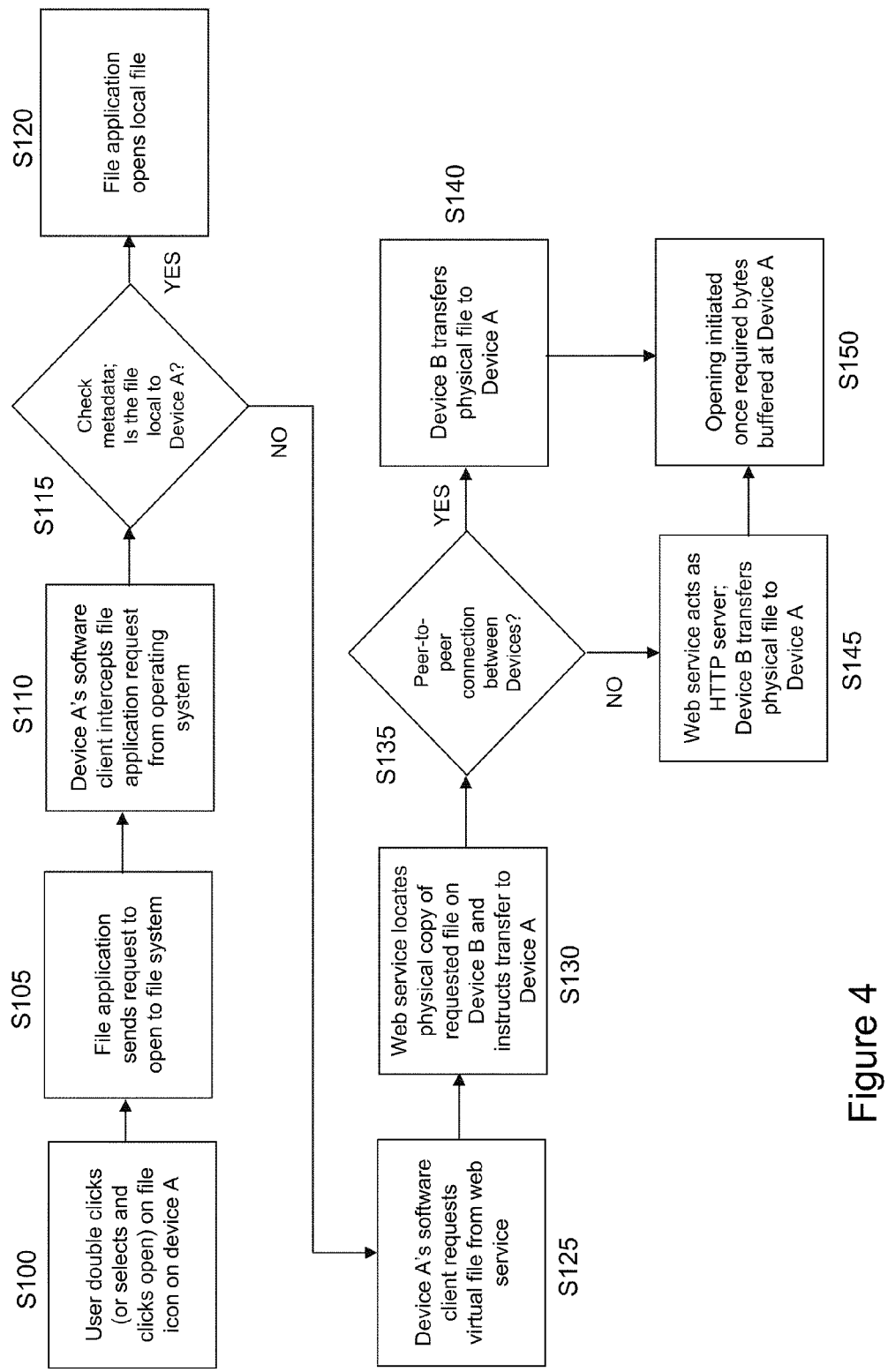
FIG. 4 is a file retrieval process flow in accordance with an exemplary embodiment of the present invention.

The software client described herein acts as an operating system plug-in to intercept calls made to files and programs in the file system of the respective user devices. An exemplary description of software client functionality responsive to calls to the file system is described below and illustrated in FIG. 4. When the user attempts to open a file on their local Device A S100, the application associated with the file, for example, Adobe Reader in the case of a .pdf file, talks to the file system and requests that the selected .pdf file be opened for read access S105. The software client intercepts this request from the operating system S110 and checks its metadata to determine whether the selected file is a local file or a virtual file (remote file) S115.

In the case of a local file, there is no action required by the software client and the file system returns the command to the operating system to open the file S120. In the case of a virtual file, the software client on Device A determines from the file's metadata the remote device on which it is stored (Device B) and asks the web service to broker a connection between Device A and Device B S125. The web service determines what type of connection is possible between Device A and Device B and instructs both devices of the communication protocol and parameters to be used for the transfer. Initially, the web service determines if a peer-to-peer connection is available S135. If that peer to peer (p-to-p) connection is possible, Device B sends the physical file directly to Device A for operation on Device A S140. In instances where a p-to-p connection is not possible, e.g., due to firewall restrictions, the web service acts as an HTTP relay server S145. During the time that the request to Device B for the file transfer to Device A is happening, the operating system, and in turn the requesting application (Adobe Reader) has no idea that the requested file is not local to Device A and is simply waiting for that command to return the number of bytes that it requested so that it can display them. The software clients, in combination with the web service, transparently perform numerous commands to request, locate and retrieve a physical copy of the virtual file without the knowledge of the requesting application or operating system. Further, the entirety of the physical file need not be downloaded in order to be responsive to most actions, so, just as with streaming video, the underlying transfer continues while the user action is taking place with the initial buffer of required bytes (e.g., approximately 32 kilobytes per read operation in the case Adobe Reader running on Mac OS X, version 10.6) S150.

Figure 5:
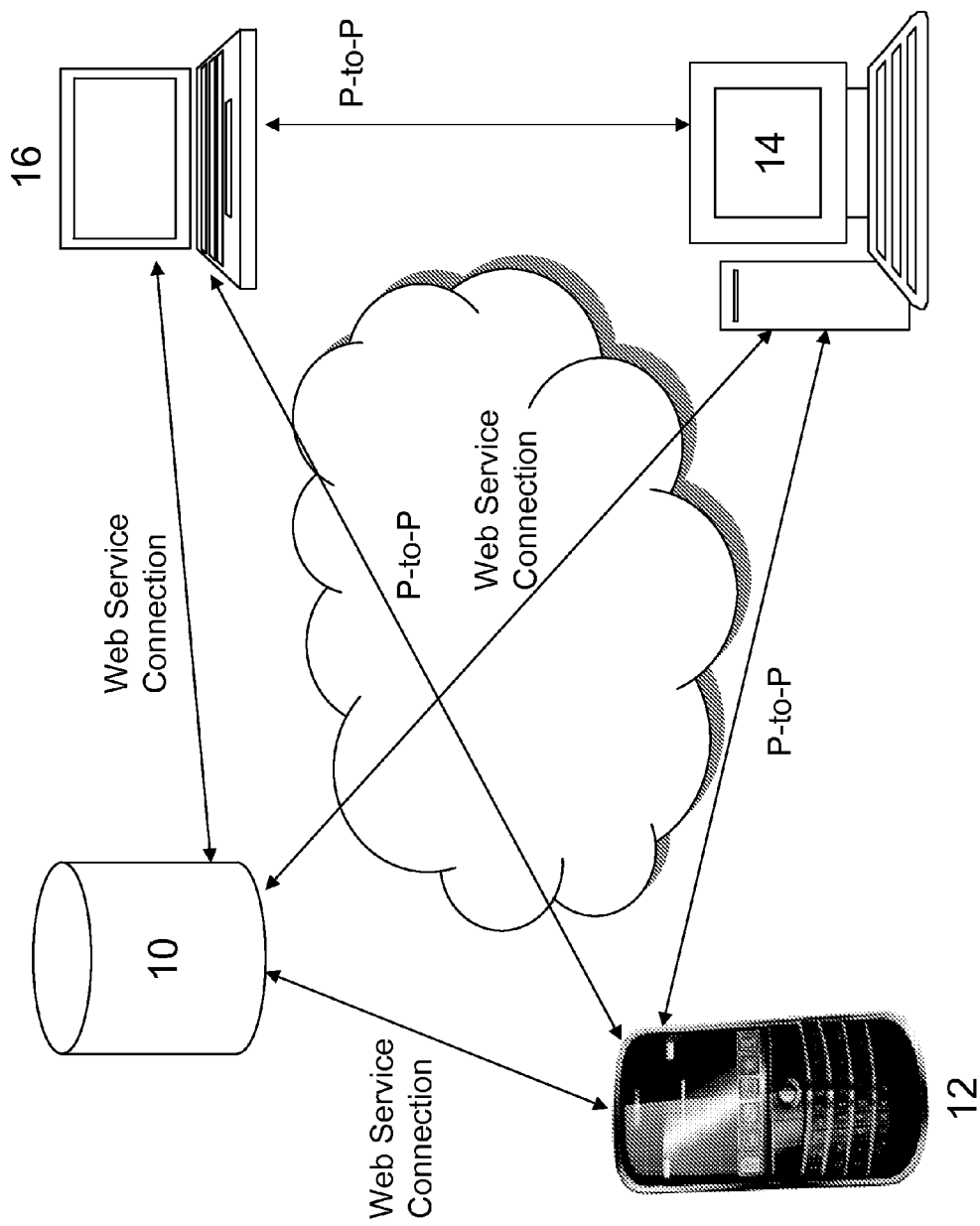
FIG. 5 is a schematic showing the exemplary configuration of FIG. 1 with communication paths therebetween.

FIG. 5 is a schematic exemplifying various devices as described with respect to FIG. 1 and connections between the devices constituting a user's closed data virtualization system in accordance with the descriptions herein.

Figure 6:
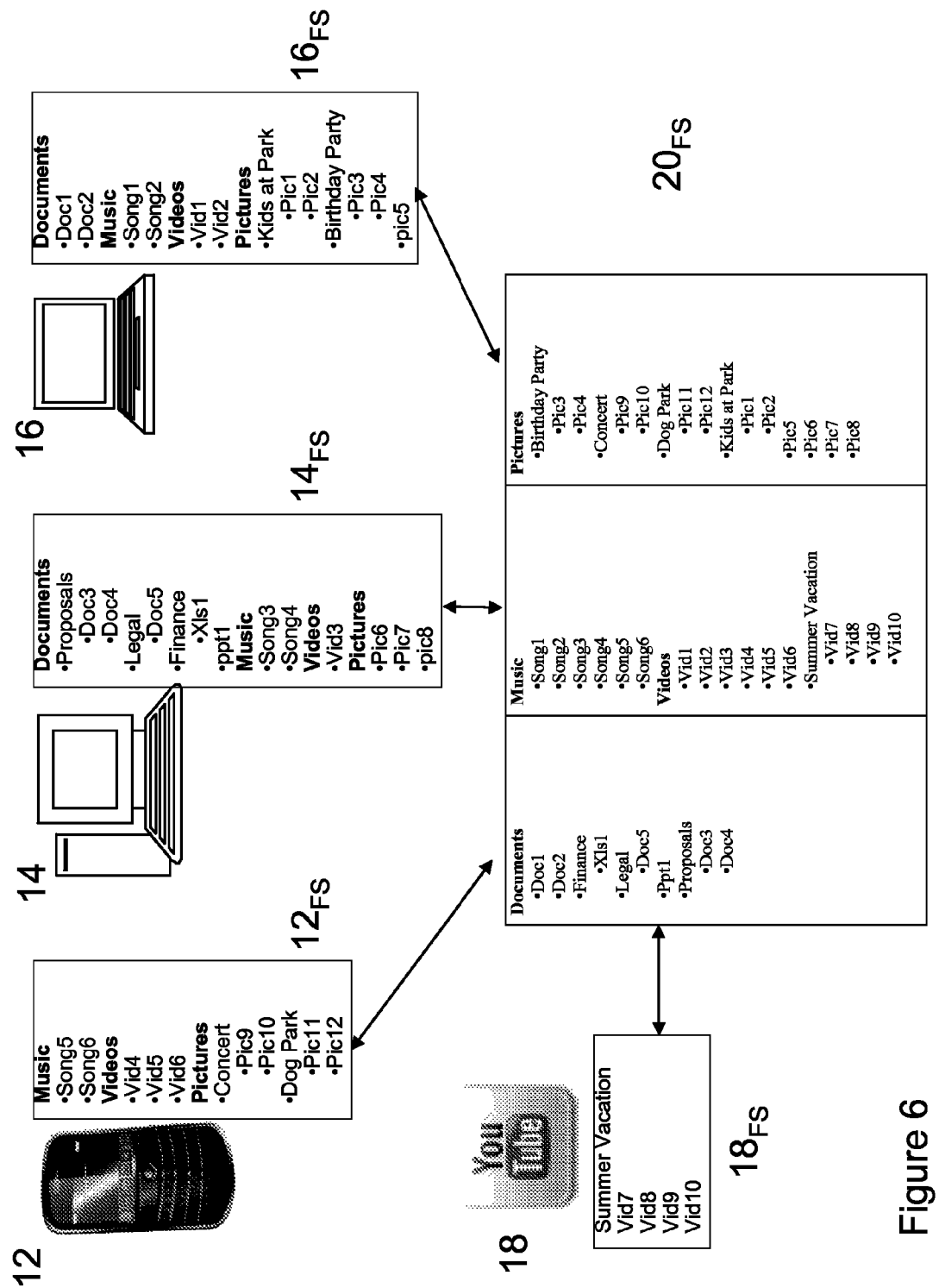
FIG. 6 illustrates an exemplary unified file structure scenario.

In the exemplary embodiments described herein, the software clients recognize and account for differences in file structures and nomenclature. So, for example, documents stored in the "Documents" folder of a user's registered Mac would show up in the "My Documents" folder of a Windows system registered to the same user. The software client and web service perform a logical mapping between available desktop platforms, e.g., Windows, Mac, Linux. FIG. 6 illustrates an exemplary unified file structure $20_{UFS}$ created from the individual device file structures $12_{UFS}$, $14_{UFS}$ and $16_{UFS}$ and on-line service file structure $18_{UFS}$ in accordance with the methods described herein. This unified file structure $20_{UFS}$ will replace file structures $12_{UFS}$, $14_{UFS}$ and $16_{UFS}$ in devices 12, 14 and 16. The file structure of on-line service 18 is not be unified.

Other than mapping between the 'canonical' elements of the file system, the software does not interfere with the user's choice of file locations. For example, if a registered user chooses to store music files in their Windows 'Desktop' folder, rather than under their 'My Music' folder, as is the convention, the software will respect their choice and make those files appear under the 'Desktop' folder of their other registered devices. Furthermore, the system is able to create unique directories on the device in order to maintain the appropriate path for a given file (in the case where a user manages their file system to have a naming system for how they store their files). In the specific cases where two devices each have a different file but with the same path, the system will employ a process for resolution. For example, the system may use a naming convention to resolve the collision and show both files on each device. For example, if there are 2 registered devices called 'Mac' and 'Windows', and a file called 'resume.doc' under 'Desktop' in both devices, the system creates 2 separate files on each device. On 'Mac', a local file called 'resume.doc' and a remote file called 'resume (Windows).doc' which is a virtual file on the local 'resume.doc' located on the 'Windows' device. On 'Windows', a local file called 'resume.doc' and a remote file called 'resume (Mac).doc which is a virtual file on the local 'resume.doc' located on the 'Mac' device. This resolution method is but one non-limiting example. One skilled in the art recognizes that other methodologies may be employed to resolve collisions in a transparent and completely automatic manner.

For certain devices, the logical mapping is not as readily accomplished as it is with established operating systems such as Mac, Windows, and Linux. For example, while numerous mobile devices, gaming consoles, cable set top boxes, televisions and other computing devices and telecommunications devices can certainly store documents, pictures, video, music and the like, the operating systems, file structures and interfaces vary significantly from one another and from the established personal computer systems. Accordingly, when a user registers mobile devices such as the iPhone, Droid or other smart phones, the listing of virtual files in an established file directory may not be feasible. Accordingly, such devices may store all virtual files in an application that is downloaded as part of the software client. When a user wishes to access content that is physically stored on a different device, the user would search for the file in the dedicated software client application.

The software embodiments may include but are not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device. The medium can utilize electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks, including various client-server configurations. Modems, cable modem, and Ethernet cards are just a few of the currently available types of network adapters.

Moreover, the disclosed processes may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture, a peer-to-peer network or a combination thereof.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The terms software client and web service as used herein can refer to any known or later developed hardware, software, firmware, or combination thereof that is capable of performing the functionality associated with that element.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

The invention claimed is:

1. A process for establishing a singular file system across multiple devices comprising:
   receiving user information to open an account for establishing a singular file system across multiple devices via a web-based system that includes at least one server;
   installing an individual software client on each of the multiple devices via the web-based system;
   accepting registration of multiple devices via the web-based system;
   scanning each of the multiple devices by each of the individual software clients to inventory data on each of the multiple devices and create a meta-index of the files for the inventoried data;
   providing by the individual software clients via the multiple devices individual meta-indices of the inventoried data for each of the multiple devices to the at least one server;
   integrating by the at least one server the individual meta-indices to create a single master meta-index;
   providing by the at least one server the single master meta-index and meta-indices for each of the other multiple devices to each of the multiple devices via the individual software clients;
   integrating metadata from the meta-indices of each of the other multiple devices into a local file system of each of the multiple devices to generate virtual files stored in the same locations as local files of the local file system, the virtual files indistinguishable from the local files by the local file system at each of the multiple devices; and
   continually updating the single master meta-index on the at least one server and each of the multiple devices in response to changes to the data indexed thereon,
   wherein the individual software clients facilitate storage of the data within each of the multiple devices in accordance with the single meta-data index by modifying file systems of each of the multiple devices to include virtual files for data from the single meta-data index that is not local to a multiple device.

2. The process according to claim 1 wherein the individual software clients vary according to the individual operating systems of each of the multiple devices.

3. The process according to claim 1 wherein registration of the multiple devices includes selection of categories of data for each of the multiple devices to be inventoried.

4. The process according to claim 3 wherein categories of data include documents, videos, pictures and music.

5. The process according to claim 1, wherein the individual software clients facilitate creation of a visual representation of the virtual files on a remote one of each of the multiple devices that is indistinguishable from a visual representation of an actual file that is located on a local one of the multiple devices.

6. The process according to claim 1, wherein the meta-data includes at least information regarding file name, file type, file size, local path the file is stored in, date created, and date modified.

7. A system for establishing a singular file system across multiple devices comprising:
   a web-accessible server;
   at least one software client plug-in;
   multiple devices for storing and operating on files;
   wherein the web-accessible server receives user information to open an account for establishing a singular file system across multiple devices, installs the at least one software plug-in on each of the multiple devices, accepts registration of the multiple devices, wherein the at least one software plug-in varies in accordance with an operating system of each of the multiple devices;
   further wherein the at least one software client plug-in scans its respective one of the multiple devices to inventory files thereon, creates a meta-index to files for the inventoried data, provides the meta-index of the inventoried data for its respective one of the multiple devices to the web-accessible server;
   further wherein the web-accessible server receives meta-indices from each of the multiple devices and integrates the meta-indices to create a single meta-index, provides the single meta-index and meta-indices for each of the other multiple devices to each of the multiple devices via the individual software clients, integrates at each of the multiple devices metadata from the meta-indices of each of the other multiple devices into a local file system of each of the multiple devices to generate virtual files stored in the same locations as local files of the local file system, the virtual files indistinguishable from the local files by the local file system at each of the multiple devices, and continually updates the single meta-index on each of the multiple devices in response to operations on the files indexed thereon,
   wherein the individual software clients facilitate storage of the data within each of the multiple devices in accordance with the single meta-data index by modifying file systems of each of the multiple devices to include virtual files for data from the single meta-data index that is not local to a multiple device.

8. The system according to claim 7, wherein the at least one software client plug-in facilitates storage of the files within its respective one of the multiple devices in accordance with the meta-data by modifying a file system of its respective one of the multiple devices to include virtual files for files from the single meta-index that are not local to the multiple device.

9. The process according to claim 8, wherein the at least one software client plug-in facilitates creation of a visual representation of the virtual files on its respective one of the multiple devices that is indistinguishable from a visual representation of an actual file that is physically located on a another of the multiple devices.

10. A non-transitory computer-readable storage medium storing a set of instructions that, when executed by a processor, cause the processor to perform operations, comprising:
   registering multiple devices with an account for establishing a singular file system across the multiple devices;

scanning each of the multiple devices to inventory data on each of the multiple devices and create a meta-index of the files for the inventory data;

generating a single master meta-index from meta-indices of files corresponding to inventory data on each of the multiple devices;

providing the single master meta-index and meta-indices for each of the other multiple devices to each of the multiple devices, metadata from the meta-indices of each of the other multiple devices to be integrated into a local file system of each of the multiple devices to generate virtual files stored in the same locations as local files of the local file system, the virtual files indistinguishable from the local files by the local file system at each of the multiple devices; and facilitating storage of data within each of the multiple devices in accordance with the single master meta-index by modifying file systems of each of the multiple devices to include virtual files for data from the single master meta-data index that is not local to a multiple device.

11. The non-transitory computer-readable storage medium of claim 10, further comprising:

continually updating the single master meta-index on each of the multiple devices in response to changes to the data indexed thereon.

12. The non-transitory computer-readable storage medium of claim 10, further comprising:

updating the single master meta-index on each of the multiple devices in response to changes to meta-indices of a local file of one of the multiple devices.

13. The non-transitory computer-readable storage medium of claim 10, further comprising:

updating the single master meta-index on each of the multiple devices in response to changes to a local file of a first device, the local file corresponding to a virtual file of a second device, the local file system of the second device retrieving the local file from the first device.

14. The non-transitory computer-readable storage medium of claim 13, wherein the virtual files and the local files in the first device are indistinguishable by the local file system of the first device.

* * * * *